United States Patent [19]

Tominaga

[11] Patent Number: 4,840,812
[45] Date of Patent: * Jun. 20, 1989

[54] METHOD OF ADJUSTING THE QUALTITY OF LIQUORS

[75] Inventor: Yasunori Tominaga, Tokyo, Japan

[73] Assignee: Live International Co., Ltd., Tokyo, Japan

[*] Notice: The portion of the term of this patent subsequent to Aug. 23, 2005 has been disclaimed.

[21] Appl. No.: 109,512

[22] Filed: Oct. 19, 1987

[30] Foreign Application Priority Data

Oct. 29, 1986 [JP] Japan .................................. 61-257897

[51] Int. Cl.$^4$ .............................................. C12G 3/08
[52] U.S. Cl. ..................................... 426/488; 426/490
[58] Field of Search ............... 426/490, 486, 487, 488, 426/489, 495, 11, 15, 14

[56] References Cited

U.S. PATENT DOCUMENTS

| | | | |
|---|---|---|---|
| 3,228,876 | 1/1966 | Mahon | 426/490 |
| 3,342,729 | 9/1967 | Strand | 426/490 |
| 4,401,678 | 8/1983 | Beamont | 426/490 |
| 4,765,997 | 8/1988 | Tominaga | 426/488 |

Primary Examiner—Donald E. Czaja
Assistant Examiner—Helen Pratt
Attorney, Agent, or Firm—Oblon, Spivak, McClelland, Maier & Neustadt

[57] ABSTRACT

A method of adjusting the quality of liquors such as wine, whiskey, brandy, sake and beer. Flavors and bouquets of such liquors are easily adjusted without using any additive or other substances. Part of odor-emitting substances and water contained in a liquor is absorbed and removed by means of the osmotic action of a highly osmotic substance that is brought into contact with the liquor through semi-permeable membranes.

14 Claims, 1 Drawing Sheet

METHOD OF ADJUSTING THE QUALTITY OF LIQUORS

FIELD OF THE INVENTION

This invention relates to a method of adjusting the quality of wine, whiskey, brandy, sake (Japanese alcoholic beverage), beer and other liquors.

DESCRIPTION OF THE PRIOR ART

There are many kinds of wines, whiskies, brandies, beers and other liquors having various flavors and bouquets around the world. For example, wines are popularly drunk both before, as aperitif, and after meals. But there are many kinds of wines having a wide variety of flavors and bouquets depending on the kinds of material grapes, manufacturing methods, additives and so on. Also people's eating habits and tastes are increasingly varied recently, so that wines having different flavors and bouquets are chosen to match the dishes and atmospheres of individual occasions. Therefore, restaurants and other similar places are required to stock a large number of wines having different flavors and bouquets to satisfy such widely varied demands of customers.

Not only wine but also whiskey, brandy, sake, beer and other liquors have their own unique bouquets and flavors. And recently not a few people like mellow ones without too strong odors.

However, it is practically very difficult for restaurants to stock many kinds of wines, whiskies, brandies and the like and for their makers to make so many kinds of products with delicately varied flavors and bouquets.

SUMMARY OF THE INVENTION

A primary object of this invention is to provide a method of adjusting the quality of liquors which enables restaurants, makers and the like to adjust the flavor and bouquet of such liquors as wine, whiskey, brandy, sake and beer without using any additive or other substances.

Another object of this invention is to provide a simple method of adjusting the quality of liquors without causing any undesirable quality changes by removing odor-emitting substances therefrom by means of the osmosis of a highly osmotic substance.

Still another object of this invention is to provide a method of making the above liquor quality adjusting operation simpler by bringing liquor into contact with a dehydrating sheet comprising semi-permeable membranes and said highly osmotic substance sealed therein.

Yet another object of this invention is to provide a method of enhancing the efficiency of quality adjustment by increasing the area of contact between said dehydrating sheet and liquor.

A further object of this invention is to provide a method of enhancing the deodorizing and dehydrating efficiencies by use of a highly osmotic substance having excellent osmosis.

The methods of this invention achieve the aforementioned objects by absorbing and removing part of the odor-emitting substances and water contained in a liquor by means of the osmosis of a highly osmotic substance that is brought into contact with the liquor through semi-permeable membranes.

When the highly osmotic substance is brought into contact with the liquor through the semi-permeable membranes, both odor-emitting substance and water move from the liquor into the highly osmotic substance to deodorize and condense the liquor, thereby achieving the desired flavor and bouquet adjustment.

Thus, the methods of this invention permit easily adjusting the flavor and bouquet of liquors without using any additives and changing their properties.

DETAILED DESCRIPTION OF THE PREFERRED EMBODIMENT

Figure 1:
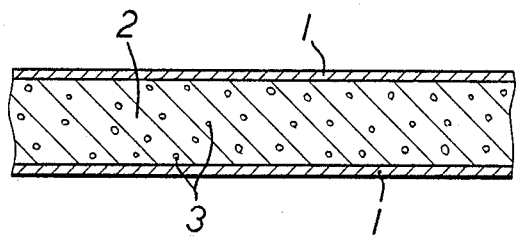
FIG. 1 is a cross-sectional view showing an example of the structure of a dehydrating sheet.

The following preferred embodiment is given to illustrate more concrete details of the quality adjusting method of this invetion.

According to the method of this invention, liquors such as wine, whiskey, brandy, sake and beer are brought into contact with a highly osmotic substance through semi-permeable membranes. The contact is achieved using a container that is partitioned into two chambers, one holding a highly osmotic substance and the other holding such liquor, a dehydrating sheet comprising semipermeable membranes and a highly osmotic substance, or some other means.

The dehydrating sheet comprises external membranes 1 of a semi-permeable substance, such as cellophane, that allows finer odor-emitting substances contained in the liquor being treated to pass therethrough together with water, as shown in FIG. 1. There are sealed between the external membranes a highly osmotic substance 2 that causes the required osmosis, such as an aqueous solution of cane sugar, and a high-molecular absorbent 3, such as acids, to absorb and hold the odor-emitting substances and water having moved into the highly osmotic substance 2. When the dehydrating sheet is brought in contact with the liquor, finer particles of the odor-emitting substances contained in the liquor move, together with water, into the the highly osmotic substance 1, and thus removed, by the osmotic action of the highly osmotic substance 2 and external membranes 1.

This osmotic action lessens the irritating odor of liquors, thereby helping to control their bouquet, and enriches their flavor. A raw wine can thus be converted into a refined one having a mellow flavor and bouquet lacked in the original one as a result of the elimination of unwanted odor and the increase in sweetness brought about by condensation that are achieved by allowing the wine to mature while kept in contact with the dehydrating sheet.

The contact between the dehydrating sheet and liquors can be established in various ways. For example, a dehydrating sheet may be immersed in a container holding a liquor therein. Or, otherwise, a liquor container may be made of a dehydrating sheet. Faster and more efficient removal of odor-emitting substances and water can be achieved by increasing the area of contact with the liquor by forming the dehydrating sheet into a helical, zigzagged or other appropriate shape.

As the highly osmotic substance, not only an aqueous solution of cane sugar but also those of other sugars, such as fruit, grape and malt sugars, can be used, either single or in combination. An aqueous solution of salt or a combination of salt and one or more of said sugars can be used, too. Addition of glycerol to the salt-containing solutions further increases their osmotic pressure.

As the semi-permeable external membranes, cellophane, parchment paper and waterproof film of polyvinyl alcohol are usable.

The following example illustrates how the method of this invention was put into practice.

[Example]

A commercially available dehydrating sheet of the structure shown in FIG. 1 was immersed in 1 liter of white wine held in a container to perform deodorization and condensation in a hermetically sealed condition for approxiately 8 hours.

When the treated wine was compared with the untreated one after taking out the dehydrating sheet, there was a marked difference in flavor and bouquet between the two. The treated one was sweeter.

While the original wine contained approximately 1.94 g/100 ml of grape extract, the quality-conditioned wine proved to contain approximately 2.30 g/100 ml. Obviously, the substantial increase in extract content was a result of condensation.

What is claimed is:

1. A method of adjusting the quality of an alcoholic liquor which comprises the step of absorbing and removing part of the odor-emitting substances and water contained therein by means of osmosis by bringing the liquor into contact with a highly osmotic substance contained between semipermeable membranes.

2. A liquor quality adjusting method according to claim 1, in which the liquor to be treated is wine.

3. A liquor quality adjusting method according to claim 1, in which the liquor to be treated is whiskey.

4. A liquor quality adjusting method according to claim 1, in which the liquor to be treated is brandy.

5. A liquor quality adjusting method according to claim 1, in which the liquor to be treated is sake.

6. A liquor quality adjusting method according to claim 1, in which the liquor to be treated is beer.

7. A liquor quality adjusting method according to claim 1, in which the highly osmotic substance is an aqueous solution of one or more sugars selected from the group consisting of cane, fruit, grape and malt sugars.

8. A liquor quality adjusting method according to claim 1, in which the highly osmotic substance is an aqueous solution of salt.

9. A liquor quality adjusting method according to claim 1, in which the highly osmotic substance is an aqueous solution of a sugar or a salt.

10. A liquor quality adjusting method according to claim 1, in which the higly osmotic substance contains glycerol.

11. A liquor quality adjusting method according to claim 1, in which a dehydrating sheet is brought into contact with a liquor, the dehydrating sheet comprising a highly osmotic substance sealed between semi-permeable external membranes.

12. A liquor quality adjusting method according to claim 11, in which the dehydrating sheet is immersed in a liquor held in a container.

13. A liquor quality adjusting method according to claim 11, in which a liquor is put in a container made of the dehydrating sheet.

14. A liquor quality adjusting method according to claim 12 or 13, in which the area of contact between the dehydrating sheet and a liquor is increased by forming the dehydrating sheet into a helical, or zigzagged shape.

* * * * *